(12) United States Patent
Krishnamurthy et al.

(10) Patent No.: US 8,762,992 B2
(45) Date of Patent: Jun. 24, 2014

(54) SYSTEMS AND METHODS FOR PROTECTING VIRTUAL MACHINES DURING PHYSICAL-TO-VIRTUAL CONVERSIONS

(75) Inventors: Lokesha Krishnamurthy, Sanford, FL (US); Steven E. Mohl, Sanford, FL (US)

(73) Assignee: Symantec Corporation, Mountain View, CA (US)

( * ) Notice: Subject to any disclaimer, the term of this patent is extended or adjusted under 35 U.S.C. 154(b) by 250 days.

(21) Appl. No.: 13/334,434

(22) Filed: Dec. 22, 2011

(65) Prior Publication Data
US 2013/0167145 A1 Jun. 27, 2013

(51) Int. Cl.
*G06F 17/00* (2006.01)
(52) U.S. Cl.
USPC ............... 718/1; 707/633; 707/639; 707/644
(58) Field of Classification Search
USPC ............... 718/1; 707/633, 639, 644
See application file for complete search history.

(56) References Cited

U.S. PATENT DOCUMENTS

| 8,010,495 | B1 * | 8/2011 | Kuznetzov et al. | 707/649 |
| 8,135,930 | B1 * | 3/2012 | Mattox et al. | 711/162 |
| 2003/0097611 | A1 * | 5/2003 | Delaney et al. | 714/13 |
| 2006/0089995 | A1 | 4/2006 | Kerr et al. | |
| 2007/0101063 | A1 * | 5/2007 | Nomoto et al. | 711/118 |
| 2009/0265706 | A1 | 10/2009 | Golosovker et al. | |
| 2010/0299666 | A1 * | 11/2010 | Agbaria et al. | 718/1 |
| 2012/0209812 | A1 * | 8/2012 | Bezbaruah et al. | 707/646 |

OTHER PUBLICATIONS

Anonymous, "vCenter Converter Administration Guide; vCenter Covnverter for vCenter Server 4.0", *Internet*, URL:http://reply.waybackmachine.org/20090530170855/http://www.vmware.com/pdf/vsp_vcc_41_admin_guide.pdf; retreived on Mar. 2, 2011,1-94.
VMWare; MVware Converter 3 Release Notes; http://www.vmware.com/support/converter/docreleasenotes_conv301.html; May 2008.
John Maxwell et al.; Virtual Snapshot Virtualization Blog; How to Minimize Backup Data by Maximizing vRanger; http://virtualizationreview.com/blogs/virtual-snapshot/list/blog-list.aspx; Jul. 2011.

* cited by examiner

*Primary Examiner* — Vincent Tran
(74) *Attorney, Agent, or Firm* — ALG Intellectual Property, LLC

(57) ABSTRACT

A computer-implemented method for safely migrating to virtualized platforms may include (1) identifying a virtual machine that is a target of a physical-to-virtual conversion from a physical server, (2) determining that the physical-to-virtual conversion includes at least one future step before the physical-to-virtual conversion is complete, (3) based on determining that the physical-to-virtual conversion includes the future step, creating a snapshot of the virtual machine before the future step, and (4) reverting the virtual machine to the snapshot before the future step. Various other methods, systems, and computer-readable media are also disclosed.

20 Claims, 6 Drawing Sheets

SYSTEMS AND METHODS FOR PROTECTING VIRTUAL MACHINES DURING PHYSICAL-TO-VIRTUAL CONVERSIONS

BACKGROUND

In the digital age, organizations increasingly rely on complex computing infrastructures to store and process data. In some scenarios, an organization may wish to perform a physical-to-virtual conversion (e.g., to migrate and/or clone applications and data on a physical server to a virtual machine). Virtualization of physical servers may provide any of a variety of benefits to an organization, such as improved utilization of resources, increased administrative flexibility, and/or disaster recovery.

In some cases, physical-to-virtual conversions may span a length of time during which a target virtual machine is incrementally synchronized with a source physical server. Unfortunately, changes to the target virtual machine during this time may disrupt the synchronization between the source physical server and the target virtual machine and render the target virtual machine unusable. For example, if a user initiates the target virtual machine in between incremental synchronization jobs, the physical-to-virtual conversion may be corrupted. Accordingly, the instant disclosure identifies and addresses a need for additional and improved systems and methods for safely migrating to virtualized platforms.

SUMMARY

As will be described in greater detail below, the instant disclosure generally relates to systems and methods for safely migrating to virtualized platforms by creating snapshots of virtual machines after conversion steps and reverting to the snapshots before subsequent conversion steps (e.g., discarding any changes made to the virtual machines between conversion steps). In one example, a computer-implemented method for safely migrating to virtualized platforms may include (1) identifying a virtual machine that is a target of a physical-to-virtual conversion from a physical server, (2) determining that the physical-to-virtual conversion includes at least one future step before the physical-to-virtual conversion is complete, (3) based on determining that the physical-to-virtual conversion includes the future step, creating a snapshot of the virtual machine before the future step, and (4) reverting the virtual machine to the snapshot before the future step.

The future step may include any of a variety of steps in the physical-to-virtual conversion. For example, the future step may include an incremental update to the virtual machine based on an incremental change to the physical server since a previous update to the virtual machine.

In some examples, creating the snapshot may include determining that the virtual machine is offline before creating the snapshot. Additionally or alternatively, creating the snapshot may entail creating the snapshot to protect the virtual machine from changing before the future step.

In some embodiments, the computer-implemented method may also include determining that the virtual machine was brought online before the future step by detecting a modification to the virtual machine based on the snapshot. In these embodiments, reverting the virtual machine to the snapshot may be based on determining that the virtual machine was brought online before the future step. In some examples, the snapshot may be configured to store each change made to the virtual machine in a snapshot data store. In these examples, reverting the virtual machine to the snapshot may include deleting the snapshot data store.

In some examples, the computer-implemented method may also include performing the future step based on reverting the virtual machine to the snapshot. Additionally or alternatively, the computer-implemented method may also include removing the snapshot based on reverting the virtual machine to the snapshot.

In one embodiment, a system for implementing the above-described method may include (1) an identification module programmed to identify a virtual machine that is a target of a physical-to-virtual conversion from a physical server, (2) a determination module programmed to determine that the physical-to-virtual conversion includes at least one future step before the physical-to-virtual conversion is complete, (3) a creation module programmed to, based on determining that the physical-to-virtual conversion includes the future step, create a snapshot of the virtual machine before the future step, and (4) a reversion module programmed to revert the virtual machine to the snapshot before the future step. The system may also include at least one processor configured to execute the identification module, the determination module, the creation module, and the reversion module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a virtual machine that is a target of a physical-to-virtual conversion from a physical server, (2) determine that the physical-to-virtual conversion includes at least one future step before the physical-to-virtual conversion is complete, (3) based on determining that the physical-to-virtual conversion includes the future step, create a snapshot of the virtual machine before the future step, and (4) revert the virtual machine to the snapshot before the future step.

As will be explained in greater detail below, by creating snapshots of virtual machines after conversion steps and reverting to the snapshots before subsequent conversion steps (e.g., and thereby discarding any changes made to the virtual machines between conversion steps), the systems and methods described herein may ensure that the virtual machines stay in their expected synchronized states in between conversion steps. Accordingly, these systems and methods may efficiently and effectively protect virtual machines during physical-to-virtual conversions against a wide range of potential interferences.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
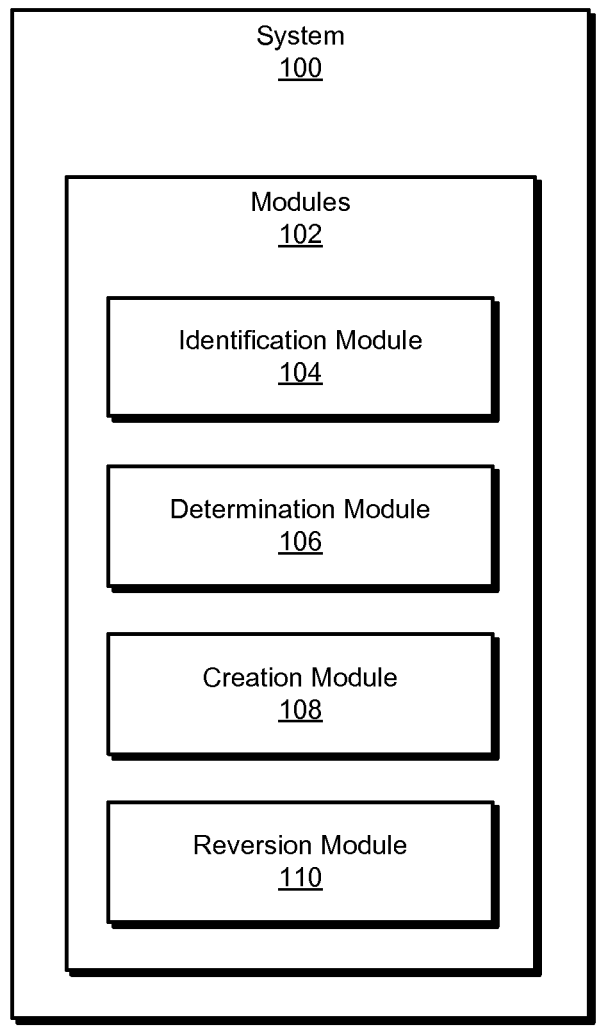
FIG. 1 is a block diagram of an exemplary system for safely migrating to virtualized platforms.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
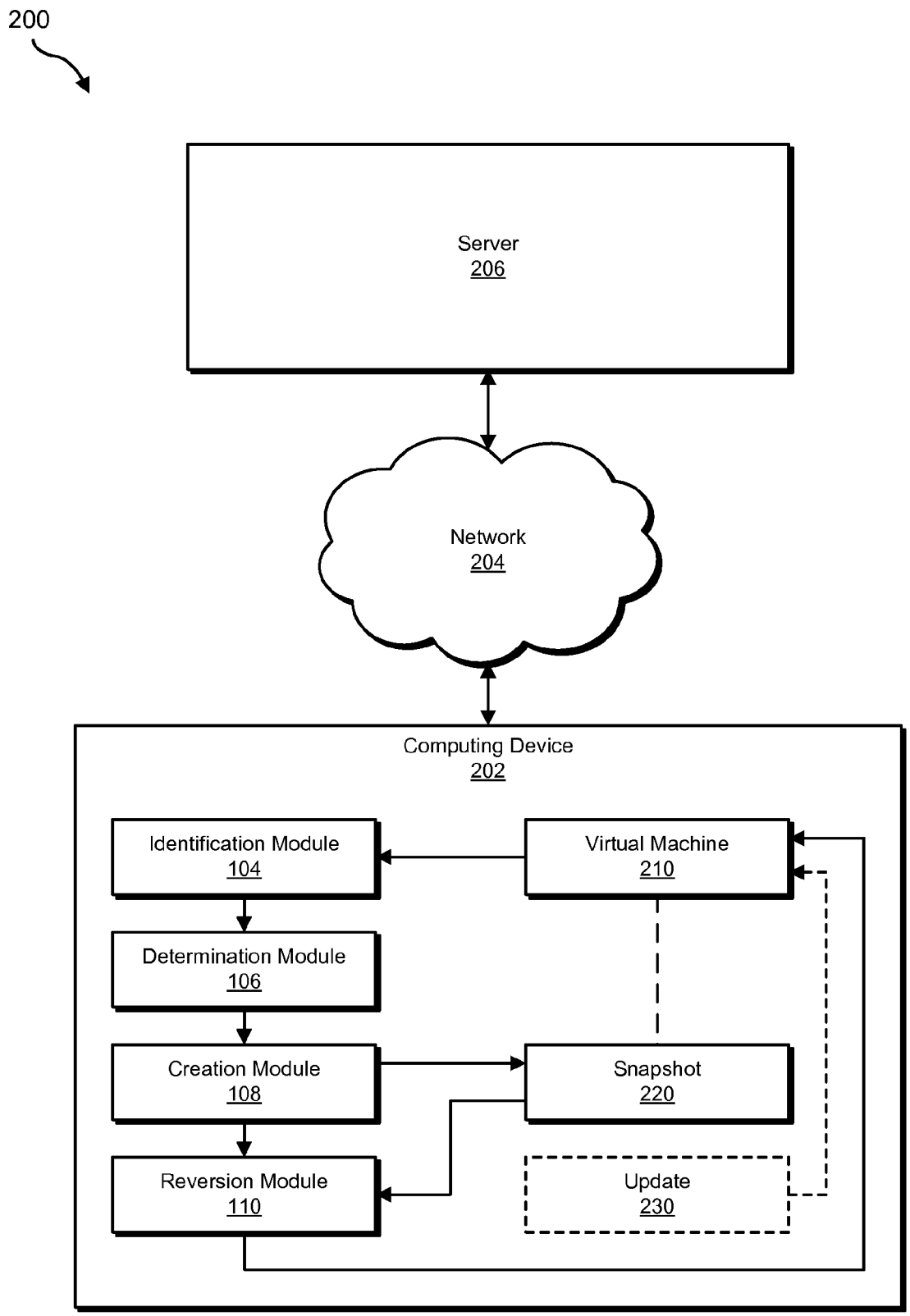
FIG. 2 is a block diagram of an exemplary system for safely migrating to virtualized platforms.

The following will provide, with reference to FIGS. 1-2, detailed descriptions of exemplary systems for safely migrating to virtualized platforms. Detailed descriptions of corresponding computer-implemented methods will also be provided in connection with FIG. 3. Detailed descriptions of an exemplary timeline for safely migrating to virtualized platforms will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for safely migrating to virtualized platforms. As illustrated in this figure, exemplary system 100 may include one or more modules 102 for performing one or more tasks. For example, and as will be explained in greater detail below, exemplary system 100 may include an identification module 104 programmed to identify a virtual machine that is a target of a physical-to-virtual conversion from a physical server. Exemplary system 100 may also include a determination module 106 programmed to determine that the physical-to-virtual conversion includes at least one future step before the physical-to-virtual conversion is complete.

In addition, and as will be described in greater detail below, exemplary system 100 may include a creation module 108 programmed to, based on determining that the physical-to-virtual conversion includes the future step, create a snapshot of the virtual machine before the future step. Exemplary system 100 may also include a reversion module 110 programmed to revert the virtual machine to the snapshot before the future step. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. For example, computing device 202 may be configured to perform a physical-to-virtual conversion of server 206 to a virtual machine 210.

In one embodiment, identification module 104, determination module 106, creation module 108, and/or reversion module 110 from FIG. 1 may, when executed by at least one processor of computing device 202, facilitate computing device 202 in safely migrating to virtualized platforms. For example, and as will be described in greater detail below, one or more of modules 102 may cause computing device 202 to (1) identify a virtual machine (e.g., virtual machine 210) that is a target of a physical-to-virtual conversion from a physical server (e.g., server 206), (2) determine that the physical-to-virtual conversion includes at least one future step (e.g., an update 230) before the physical-to-virtual conversion is complete, (3) based on determining that the physical-to-virtual conversion includes the future step, create a snapshot (e.g., a snapshot 220) of the virtual machine before the future step, and (4) revert the virtual machine to the snapshot before the future step (e.g., revert virtual machine 210 to snapshot 220 before update 230).

Computing device 202 generally represents any type or form of computing device capable of reading computer-executable instructions. Examples of computing device 202 include, without limitation, servers, hypervisors, laptops, desktops, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of performing one or more computer-executed tasks and/or providing one or more computing resources. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
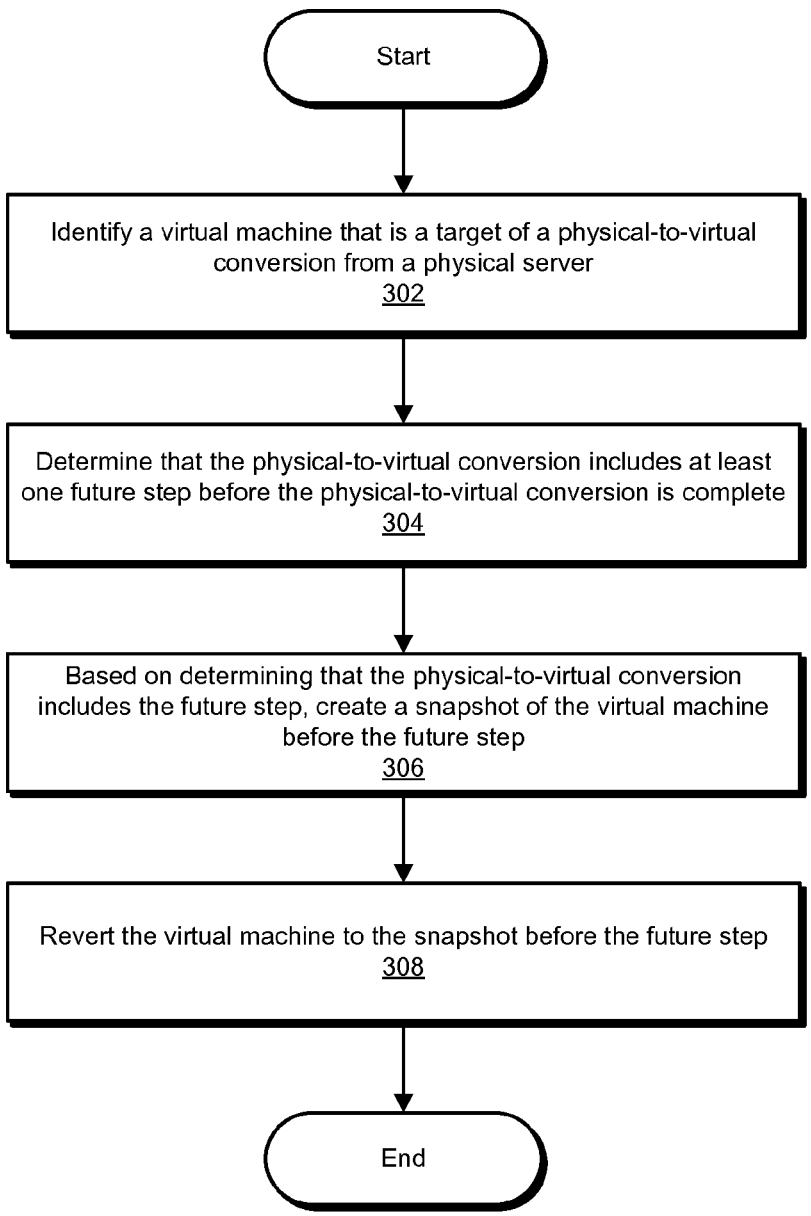
FIG. 3 is a flow diagram of an exemplary method for safely migrating to virtualized platforms.

FIG. 3 is a flow diagram of an exemplary computer-implemented method 300 for safely migrating to virtualized platforms. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a virtual machine that is a target of a physical-to-virtual conversion from a physical server. For example, at step 302 identification module 104 may, as part of computing device 202 in FIG. 2, identify virtual machine 210 as a target of a physical-to-virtual conversion from server 206.

As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications.

As used herein, the phrase "physical-to-virtual conversion" may refer to any process of creating a virtualized system from a physical computing system. The physical-to-virtual conversion may include provisioning the virtualized system with an operating system of the physical computing system, one or more applications of the physical computing system, and/or data stored on, accessible to, and/or managed by the physical computing system. In some examples, the physical-to-virtual conversion may include cloning the physical computing system as a virtualized system. Additionally or alternatively, the physical-to-virtual conversion may include migrating the physical computing system to a virtualized system. In some examples, the physical-to-virtual conversion may include a live migration of the physical computing system to the virtualized system. In some examples, the physical-to-virtual conversion may be performed based on a predetermined schedule and/or policy including one or more discrete steps and/or jobs. For example, the physical-to-virtual conversion may include an initial migration of data followed by one or more incremental and/or differential updates to the data.

The physical-to-virtual conversion may include creating and/or copying a variety of data representing and/or corresponding to the physical server. For example, the physical-to-virtual conversion may include creating and populating a virtual machine disk image with data stored, accessed, and/or managed by the physical server. As used herein, the phrase "virtual machine disk image" may refer to any file and/or image containing data stored for the use of a virtual machine. In some examples, the data as stored within the virtual machine disk image may reflect the raw contents and/or structure of a virtual storage device. For example, the phrase "virtual machine disk image" may refer to any data structure that may be interpreted by a virtual machine as a disk or other physical storage medium (e.g., a solid-state storage device). In one example, the phrase "virtual machine disk image" may refer to a VMWARE VIRTUAL MACHINE DISK ("VMDK"). In some examples, the physical-to-virtual conversion may also include creating and/or maintaining current configuration data for the virtual machine based on the physical server and/or state information reflecting a state of the physical server.

Identification module 104 may identify the virtual machine in any of a variety of ways. For example, identification module 104 may operate as a part of a physical-to-virtual conversion system and receive a request to perform the physical-to-virtual conversion with the virtual machine as the target. Additionally or alternatively, identification module 104 may receive a message from and/or intercept a message from or for a physical-to-virtual conversion system. In some examples, identification module 104 may identify the virtual machine by identifying one or more components of the virtual machine to protect (e.g., a virtual machine disk image, state and/or configuration files of the virtual machine, etc.).

Figure 4:
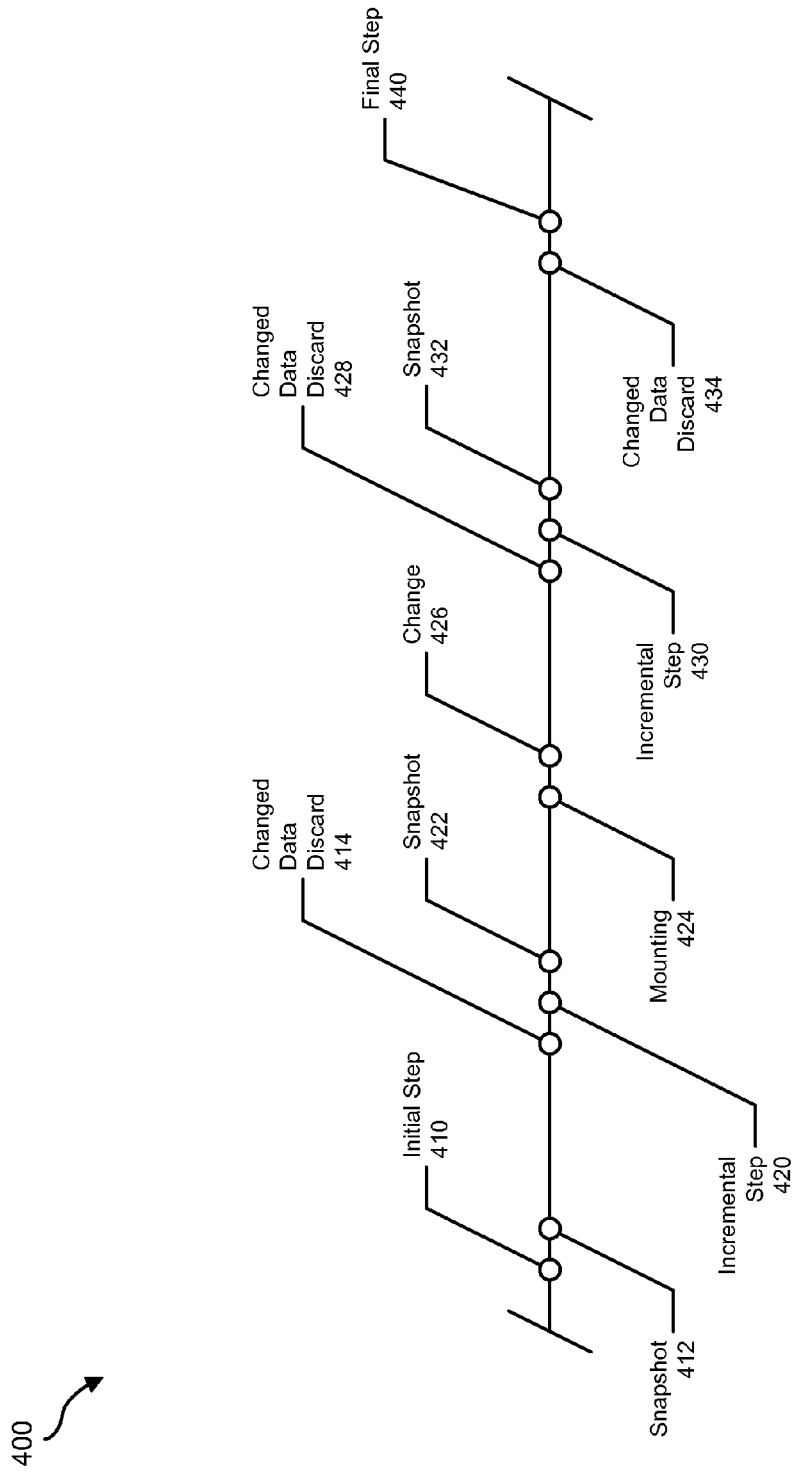
FIG. 4 is an exemplary timeline for safely migrating to virtualized platforms.

FIG. 4 illustrates an exemplary timeline 400 of a physical-to-virtual conversion. As shown in FIG. 4, exemplary timeline 400 may include an initial step 410 at which the physical-to-virtual conversion is initiated. In some examples, identification module 104 may identify the virtual machine at initial step 410.

Returning to FIG. 3, at step 304 one or more of the systems described herein may determine that the physical-to-virtual conversion includes at least one future step before the physical-to-virtual conversion is complete. For example, at step 304 determination module 106 may, as part of computing device 202 in FIG. 2, determine that the physical-to-virtual conversion includes update 230 before the physical-to-virtual conversion is complete.

As used herein, the term "step" as applied to a physical-to-virtual conversion may include any portion of a physical-to-virtual conversion process that entails a change to data used by and/or constituting a virtual machine. As mentioned earlier, the physical-to-virtual conversion may be performed based on a predetermined schedule and/or policy including one or more discrete steps and/or jobs, including one or more incremental and/or differential updates to virtual machine data. Accordingly, the future step may include any such step. For example, the future step may include an incremental update to the virtual machine based on an incremental change to the physical server since a previous update to the virtual machine. Additionally or alternatively, the future step may include an incremental addition to the virtual machine representing data that had not yet been migrated from the physical server.

Using FIG. 4 as an example, timeline 400 may include four physical-to-virtual conversion steps: initial step 410, an incremental step 420, an incremental step 430, and a final step 440. At initial step 410, determination module 106 may determine that the physical-to-virtual conversion includes incremental step 420 in the future. Likewise, at incremental step 420, determination module 106 may determine that the physical-to-virtual conversion includes incremental step 430 in the future. Similarly, at incremental step 430, determination module 106 may determine that the physical-to-virtual conversion includes final step 440 in the future.

Determination module 106 may determine that the physical-to-virtual conversion includes a future step in any of a variety of ways. For example, determination module 106 may inspect a schedule and/or policy of the physical-to-virtual conversion to identify a step that has yet to be performed. Additionally or alternatively, determination module 106 may query an agent and/or read a configuration file to determine that the physical-to-virtual conversion is not yet complete. In some examples, determination module 106 may assume and/or behave as if the physical-to-virtual conversion includes a future step in the absence of information and/or instructions to the contrary.

Returning to FIG. 3, at step 306 one or more of the systems described herein may, based on determining that the physical-to-virtual conversion includes the future step, create a snapshot of the virtual machine before the future step. For example, at step 306 creation module 108 may, as part of computing device 202 in FIG. 2, based on determining that the physical-to-virtual conversion includes update 230 (e.g., in the future), create snapshot 220 of virtual machine 210 before update 230. Using FIG. 4 as an example, at step 306 creation module 108 may create a snapshot 412. In another example, at step 306 creation module 108 may create a snapshot 422. In an additional example, at step 306 creation module 108 may create a snapshot 432.

As used herein, the term "snapshot" may refer to any representation of a collection of data in a certain state and/or point in time. In some examples, the term "snapshot" may refer to a space-saving snapshot (e.g., a snapshot that references a primary volume for unchanged data and stores changes in a snapshot file). In some examples, the snapshot may include a block-level snapshot (e.g., recording changed blocks).

The snapshot may cover any data corresponding to the virtual machine requiring protection. For example, the snapshot may cover a virtual machine disk file, a virtual machine state file, and/or a virtual machine configuration file.

Creation module 108 may create the snapshot in any suitable contexts. For example, creation module 108 may create the snapshot to protect the virtual machine from changing before the future step. Accordingly, creation module 108 may create the snapshot immediately after a previous conversion step was applied. Using FIG. 4 as an example, after incremental step 420 creation module 108 may immediately take snapshot 422 of the virtual machine. In some examples, creation module 108 may determine that the virtual machine is offline before creating the snapshot. In this manner, creation module 108 may ensure that the virtual machine has not been brought online since a previous conversion step was applied.

Returning to FIG. 3, at step 308 one or more of the systems described herein may revert the virtual machine to the snapshot before the future step. For example, at step 308 reversion module 110 may, as part of computing device 202 in FIG. 2, revert virtual machine 210 to snapshot 220 before update 230. Using FIG. 4 as an example, at step 308 reversion module 110 may revert the virtual machine to snapshot 422 before incremental step 430 by performing a changed data discard 428.

As mentioned earlier, by reverting the virtual machine to the snapshot, reversion module 110 may bring the virtual machine back to a state achieved in a previous conversion step. Using FIG. 4 as an example, by performing changed data discard 428 to revert to snapshot 422, reversion module 110 may bring the virtual machine back to a state achieved by incremental step 420. Accordingly, even after a mounting 424 of the virtual machine and a change 426 to the virtual machine, incremental step 430 may be applied as if no changes were made to the virtual machine since incremental step 420.

Reversion module 110 may revert the virtual machine in any suitable context. In some examples, reversion module 110 may determine that the virtual machine was brought online before the future step by detecting a modification to the virtual machine based on the snapshot. For example, reversion module 110 may determine that the snapshot data is not empty (e.g., that it reflects at least one change). In these examples, reversion module 110 may revert the virtual machine to the snapshot based on determining that the virtual machine was brought online before the future step. Additionally or alternatively, reversion module 110 may revert the virtual machine without regard to whether the virtual machine was brought online and/or any changes were made to the virtual machine. Using FIG. 4 as an example, reversion module 110 may perform a changed data discard 414 by discarding snapshot 412 even though no change was made to the virtual machine after snapshot 412. Likewise, reversion module 110 may perform a changed data discard 434 by discarding snapshot 432 even though no change was made to the virtual machine after snapshot 432.

Reversion module 110 may revert the virtual machine in any suitable manner. For example, as mentioned earlier, the snapshot may be configured preserve the virtual machine data by redirecting any changes to the virtual machine data to a snapshot data store. In this example, reversion module 110 may revert the virtual machine to the snapshot simply by deleting the snapshot data store (e.g., and thereby discarding any changes made).

In some examples, before reverting to the snapshot, reversion module 110 may confirm the snapshot has not been interfered with. For example, reversion module 110 may confirm that a snapshot image corresponding to the virtual machine exists and/or that the snapshot was taken immediately after a previous conversion step. In this manner, reversion module 110 may ensure that the snapshot has been protecting the virtual machine. In some examples, reversion module 110 may determine that the snapshot image does not exist and cause the physical-to-virtual conversion to fail and/or to recover to a prior stage and/or issue a warning that the virtual machine may not be reliable.

As mentioned above, in some examples the snapshot may be configured to store each change made to the virtual machine in a snapshot data store. For example, the snapshot may store changes in a snapshot file.

In some examples, reversion module 110 may also perform the future step based on reverting the virtual machine to the snapshot. For example, reversion module 110 may, after reverting the virtual machine to the snapshot, determine that the virtual machine is ready for the future step of the physical-to-virtual conversion, and perform the future step based on the readiness of the virtual machine.

In some examples, reversion module 110 may also remove the snapshot based on reverting the machine to the snapshot. For example, reversion module 110 may discontinue a snapshot process (e.g., so that attempted changes made to the virtual machine are performed directly on the virtual machine data and not within a snapshot data store).

As explained above, by creating snapshots of virtual machines after conversion steps and reverting to the snapshots before subsequent conversion steps (e.g., and thereby discarding any changes made to the virtual machines between conversion steps), the systems and methods described herein may ensure that the virtual machines stay in their expected synchronized states in between conversion steps. Accordingly, these systems and methods may efficiently and effectively protect virtual machines during physical-to-virtual conversions against a wide range of potential interferences.

Figure 5:
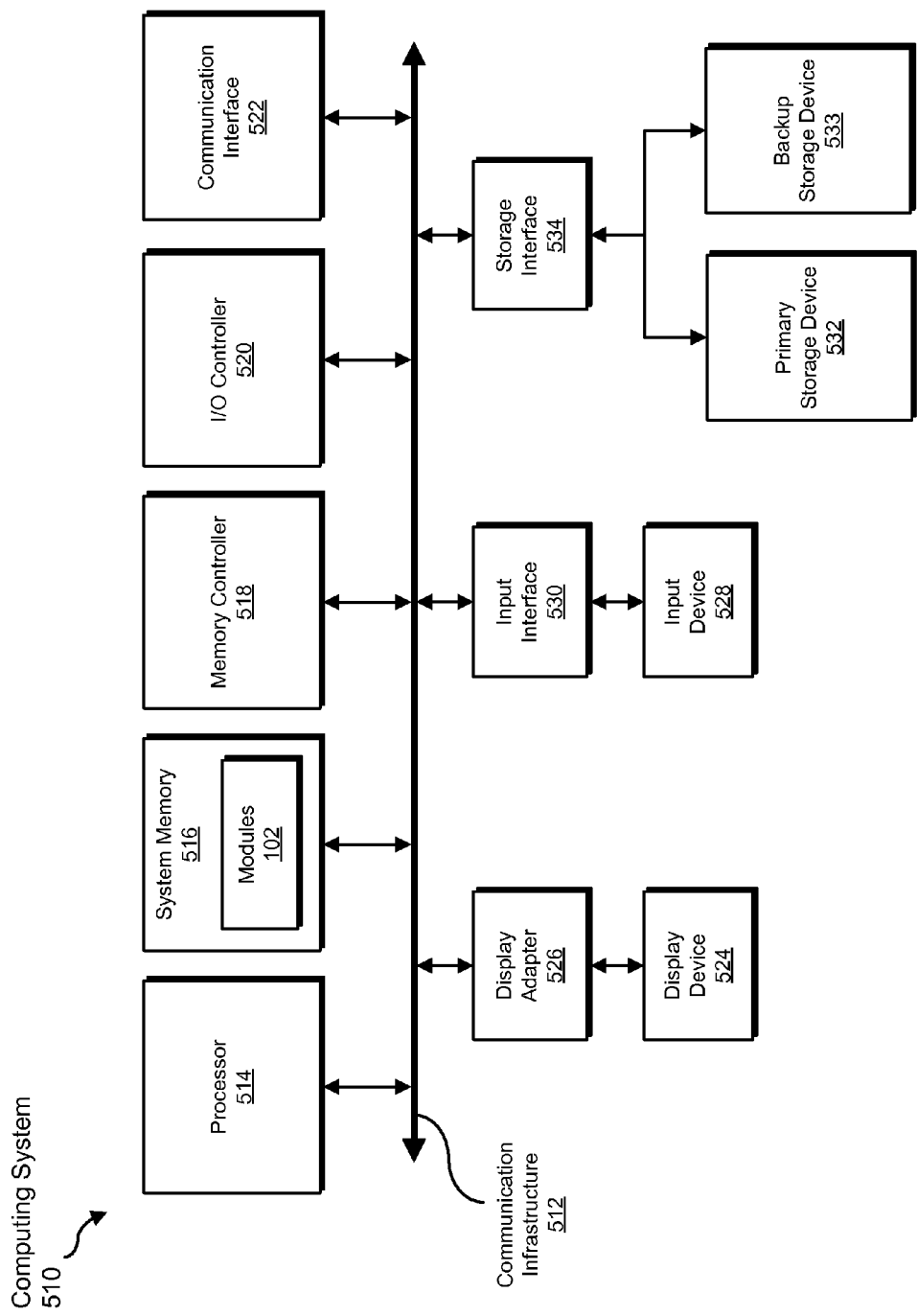
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, determining, creating, reverting, performing, and removing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
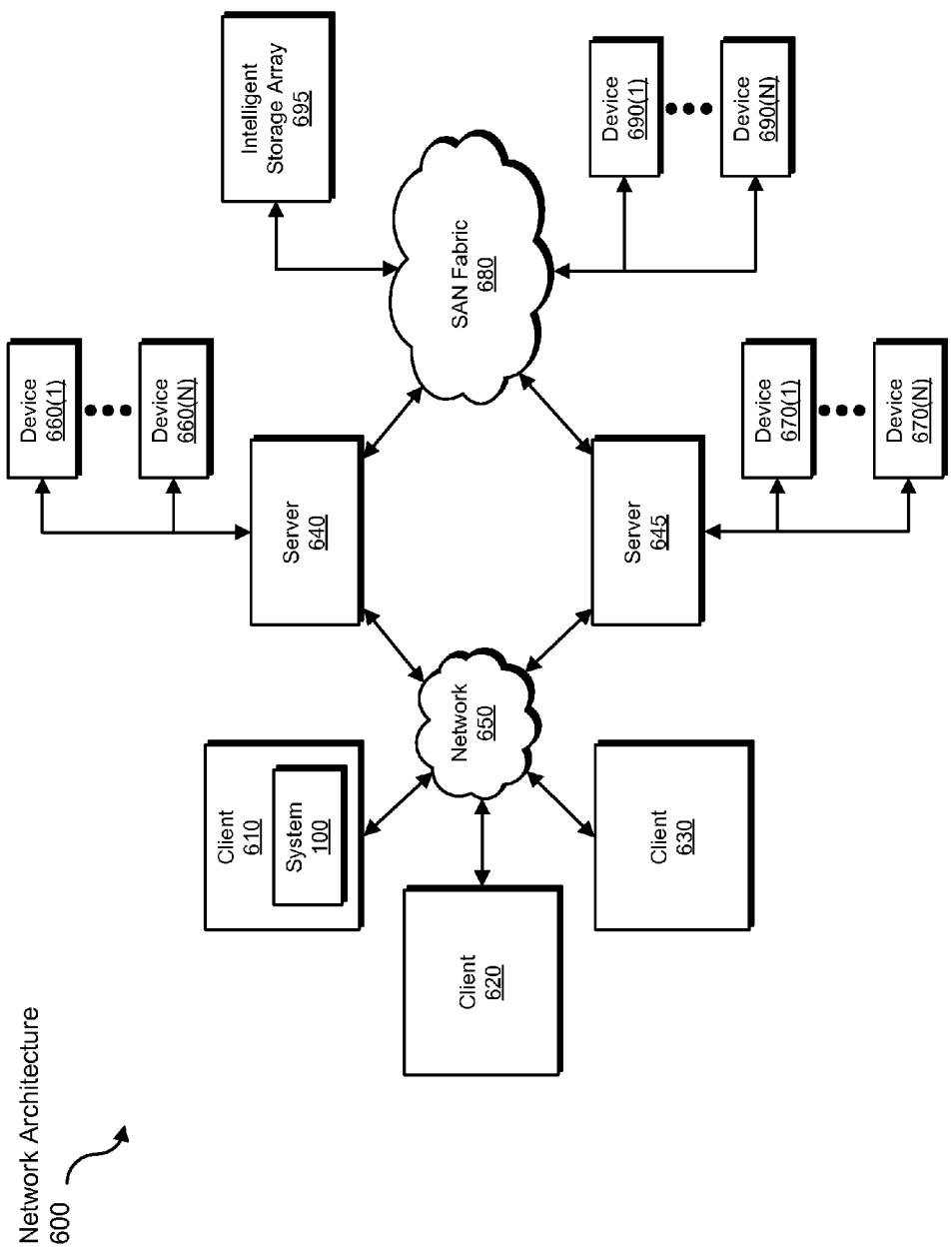
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, determining, creating, reverting, performing, and removing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for safely migrating to virtualized platforms.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for safely migrating to virtualized platforms. As another example, one or more of the modules recited herein may transform a corrupted virtual machine in a physical-to-virtual conversion process to an uncorrupted virtual machine.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for safely migrating to virtualized platforms, at least a portion of the method being performed by a computing device comprising at least one processor, the method comprising:
   identifying a virtual machine that is a target of a physical-to-virtual conversion from a physical server;
   determining that the physical-to-virtual conversion comprises at least one future step before the physical-to-virtual conversion is complete;
   based on determining that the physical-to-virtual conversion comprises the future step, creating a snapshot of the virtual machine before the future step;
   reverting the virtual machine to the snapshot before the future step.

2. The computer-implemented method of claim 1, wherein creating the snapshot comprises creating the snapshot to protect the virtual machine from changing before the future step.

3. The computer-implemented method of claim 1, wherein creating the snapshot comprises determining that the virtual machine is offline before creating the snapshot.

4. The computer-implemented method of claim 1, further comprising determining that the virtual machine was brought online before the future step by detecting a modification to the virtual machine based on the snapshot;
   wherein reverting the virtual machine to the snapshot is based on determining that the virtual machine was brought online before the future step.

5. The computer-implemented method of claim 1, wherein:
   the snapshot is configured to store each change made to the virtual machine in a snapshot data store;
   reverting the virtual machine to the snapshot comprises deleting the snapshot data store.

6. The computer-implemented method of claim 1, wherein the future step comprises an incremental update to the virtual machine based on an incremental change to the physical server since a previous update to the virtual machine.

7. The computer-implemented method of claim 1, further comprising performing the future step based on reverting the virtual machine to the snapshot.

8. The computer-implemented method of claim 1, further comprising removing the snapshot based on reverting the virtual machine to the snapshot.

9. A system for safely migrating to virtualized platforms, the system comprising:
   an identification module programmed to identify a virtual machine that is a target of a physical-to-virtual conversion from a physical server;
   a determination module programmed to determine that the physical-to-virtual conversion comprises at least one future step before the physical-to-virtual conversion is complete;
   a creation module programmed to, based on determining that the physical-to-virtual conversion comprises the future step, create a snapshot of the virtual machine before the future step;
   a reversion module programmed to revert the virtual machine to the snapshot before the future step;
   at least one processor configured to execute the identification module, the determination module, the creation module, and the reversion module.

10. The system of claim 9, wherein the creation module is programmed to create the snapshot by creating the snapshot to protect the virtual machine from changing before the future step.

11. The system of claim 9, wherein the creation module is programmed to create the snapshot by determining that the virtual machine is offline before creating the snapshot.

12. The system of claim 9, wherein:
   the reversion module is further programmed to determine that the virtual machine was brought online before the future step by detecting a modification to the virtual machine based on the snapshot;
   the reversion module is programmed to revert the virtual machine to the snapshot based on determining that the virtual machine was brought online before the future step.

13. The system of claim 9, wherein:
   the snapshot is configured to store each change made to the virtual machine in a snapshot data store;
   the reversion module is programmed to revert the virtual machine to the snapshot by deleting the snapshot data store.

14. The system of claim 9, wherein the future step comprises an incremental update to the virtual machine based on an incremental change to the physical server since a previous update to the virtual machine.

15. The system of claim 9, wherein the reversion module is further programmed to perform the future step based on reverting the virtual machine to the snapshot.

16. The system of claim 9, wherein the reversion module is further programmed to remove the snapshot based on reverting the virtual machine to the snapshot.

17. A non-transitory computer-readable-storage medium comprising one or more computer-executable instructions that, when executed by at least one processor of a computing device, cause the computing device to:
- identify a virtual machine that is a target of a physical-to-virtual conversion from a physical server;
- determine that the physical-to-virtual conversion comprises at least one future step before the physical-to-virtual conversion is complete;
- based on determining that the physical-to-virtual conversion comprises the future step, create a snapshot of the virtual machine before the future step;
- revert the virtual machine to the snapshot before the future step.

18. The non-transitory computer-readable-storage medium of claim 17, wherein the one or more computer-readable instructions cause the computing device to create the snapshot to protect the virtual machine from changing before the future step.

19. The non-transitory computer-readable-storage medium of claim 17, wherein the one or more computer-readable instructions cause the computing device to create the snapshot by causing the computing device to determine that the virtual machine is offline before creating the snapshot.

20. The non-transitory computer-readable-storage medium of claim 17, wherein:
- the one or more computer-readable instructions further cause the computing device to determine that the virtual machine was brought online before the future step by detecting a modification to the virtual machine based on the snapshot;
- the one or more computer-readable instructions cause the computing device to revert the virtual machine to the snapshot based on determining that the virtual machine was brought online before the future step.

* * * * *